(12) United States Patent
Mei (10) Patent No.: US 12,449,545 B2
(45) Date of Patent: Oct. 21, 2025

(54) TOF CAMERA, GROUND OBSTACLE DETECTION METHOD THEREOF, AND GROUND NAVIGATION DEVICE

(71) Applicant: Shanghai Juyou Smart Intelligence Technology CO., LTD, Shanghai (CN)

(72) Inventor: Jian Mei, Shanghai (CN)

(73) Assignee: SHANGHAI JUYOU SMART INTELLIGENCE TECHNOLOGY CO., LTD, Shanghai (CN)

( * ) Notice: Subject to any disclaimer, the term of this patent is extended or adjusted under 35 U.S.C. 154(b) by 912 days.

(21) Appl. No.: 17/637,898

(22) PCT Filed: Sep. 18, 2020

(86) PCT No.: PCT/CN2020/116171
§ 371 (c)(1),
(2) Date: Feb. 24, 2022

(87) PCT Pub. No.: WO2022/011826
PCT Pub. Date: Jan. 20, 2022

(65) Prior Publication Data
US 2022/0276386 A1      Sep. 1, 2022

(30) Foreign Application Priority Data

Jul. 15, 2020   (CN) .......................... 202010679917.4

(51) Int. Cl.
*G01S 17/894*    (2020.01)
*G01B 11/22*     (2006.01)

(52) U.S. Cl.
CPC ............ *G01S 17/894* (2020.01); *G01B 11/22* (2013.01)

(58) Field of Classification Search
None
See application file for complete search history.

(56) References Cited

U.S. PATENT DOCUMENTS

2018/0025236 A1    1/2018    Lin et al.

FOREIGN PATENT DOCUMENTS

| CN | 109214348 A | 1/2019 |
| CN | 109814564 A | 5/2019 |

(Continued)

OTHER PUBLICATIONS

Translation for CN 112423640 (Year: 2019).*

(Continued)

*Primary Examiner* — Lennin R Rodriguezgonzalez
(74) *Attorney, Agent, or Firm* — FisherBroyles, LLP; Roger L. Browdy; Ronni S. Jillions (57) ABSTRACT

This application discloses a TOF camera, a ground obstacle detection method thereof, and a ground navigation device. The ground obstacle detection method of the TOF camera includes: using depth data of a reference plane as a reference depth value; performing distance detection, and comparing an actually measured depth value at a measured position with a corresponding reference depth value; replacing the actually measured depth value with a characteristic value if the actually measured depth value is greater than or equal to the reference depth value, and marking the corresponding position as a passable region; and using the actually measured depth value at the position as a measured depth value if the actually measured depth value is less than the reference depth value. The ground obstacle detection method can improve the accuracy of obstacle detection.

16 Claims, 4 Drawing Sheets

(56) References Cited

FOREIGN PATENT DOCUMENTS

| | | | | |
|---|---|---|---|---|
| CN | 109872324 A | 6/2019 | | |
| CN | 111368607 A | 7/2020 | | |
| CN | 112423640 A | * 2/2021 | ............. | A47L 9/009 |

OTHER PUBLICATIONS

Translation for CN 109872324 (Year: 2019).*
Translation for CN 109214348 (Year: 2018).*
Qin Yuxin et al., "A Modular Local Grid Map Building Algorithm for Complex Three-dimensional Environment," Control Engineering of China, vol. 23, No. 10, Oct. 2016 pp. 1-7-English abstract.

* cited by examiner

TOF CAMERA, GROUND OBSTACLE DETECTION METHOD THEREOF, AND GROUND NAVIGATION DEVICE

FIELD OF TECHNOLOGY

The present application relates to the field of distance sensing technology, and in particular, to a time of flight (TOF) camera, a ground obstacle detection method thereof, and a ground navigation device.

BACKGROUND

A time of flight (TOF) camera measures a distance, a three-dimensional structure, or a three-dimensional profile of a measured object by using a time interval from emission to reception of a pulsed signal emitted by a sensor or a phase generated when laser reaches and returns from the measured object once. A TOF sensor can obtain a grayscale image and a distance image simultaneously, and is widely applied in various fields such as somatosensory control, behavior analysis, monitoring, automatic driving, artificial intelligence, machine vision, and automatic 3D modeling.

The TOF camera is widely used in the field of ground navigation of an automated guided vehicle (AGV), for example, a sweeping robot and so on. During ground navigation, because ground environments are complex, for example, materials and scenes of different regions on the ground are different, different regions have greatly different reflectivities. As a result, factors such as multi-path reflection light greatly affect accuracy of distance measurement, and a ground position cannot be accurately recognized, resulting in a large error in determination of an obstacle.

How to improve the accuracy of obstacle detection during ground navigation is an urgent problem to be resolved currently.

SUMMARY

In view of the above, this application provides a TOF camera and a ground obstacle detection method thereof, and a ground navigation device, to resolve a problem in the prior art that ground obstacle detection is inaccurate due to ground environment difference.

This application provides a ground obstacle detection method of a TOF camera, including: using depth data of a reference plane as a reference depth value; performing distance detection, and comparing an actually measured depth value at a measured position with a corresponding reference depth value; replacing the actually measured depth value with a characteristic value if the actually measured depth value is greater than or equal to the reference depth value, and marking the corresponding position as a passable region; and remaining the actually measured depth value at the position as a measured depth value if the actually measured depth value is less than the reference depth value.

Optionally, a method for obtaining the reference depth value includes: selecting a standard plane, fixing a position of the TOF camera, and detecting standard depth data at each position of the standard plane, where a height difference between the standard plane and the TOF camera is H and the standard plane has a flat surface, and the standard depth data is not interfered by an external environment; and determining a height difference between the reference plane and the standard plane according to a feature of an actual ground, and obtaining, through calculation, the depth data of the reference plane as the reference depth value according to the standard depth data of the standard plane.

Optionally, when the actual ground is flat and a height difference between the actual ground and the TOF camera is consistent with the height difference between the standard plane and the TOF camera, the standard plane is used as the reference plane.

Optionally, when the actual ground is flat and a height difference between the actual ground and the TOF camera is H', the height difference between the reference plane and the standard plane is set to H–H'.

Optionally, when the actual ground has a recess or a protrusion, the reference plane is set to be higher than the standard plane and the height difference between the reference plane and the standard plane is D.

Optionally, the height difference D is greater than or equal to a height of the recess or the protrusion of the actual ground.

The technical solution of the present disclosure further provides a TOF camera, including: a storage module, configured to store a reference depth value and a characteristic value, wherein the reference depth value is depth data of a reference plane, and the characteristic value is used for marking a passable region; a detection module, configured to obtain an actually measured depth value at a measured position; and a processor, configured to: compare the actually measured depth value at the measured position with a corresponding reference depth value; replace the actually measured depth value with the characteristic value if the actually measured depth value is greater than or equal to the reference depth value, and mark the corresponding position as a passable region; and remain the actually measured depth value at the position as the measured depth value if the actually measured depth value is less than the reference depth value.

Optionally, a method for obtaining the reference depth value includes: selecting a standard plane, fixing a position of the TOF camera, and detecting standard depth data at each position of the standard plane, wherein a distance between the standard plane and the TOF camera is fixed and the standard plane has a flat surface, and the standard depth data is not interfered by an external environment; and determining a height difference between the reference plane and the standard plane according to a feature of an actual ground, and obtaining, through calculation, the depth data of the reference plane as the reference depth value according to the standard depth data of the standard plane.

Optionally, when a height difference between the actual ground and the TOF camera is consistent with the height difference between the standard plane and the TOF camera, the standard plane is used as the reference plane.

Optionally, when the actual ground is flat and a height difference between the actual ground and the TOF camera is H', the height difference between the reference plane and the standard plane is set to H–H'.

Optionally, when the actual ground has a recess or a protrusion, the height difference between the reference plane and the standard plane is set to D, and the height difference D is greater than or equal to a height of the recess or the protrusion of the actual ground.

The technical solution of the present disclosure further provides a ground navigation device, including the TOF camera.

According to the obstacle detection method of a TOF camera described above in this application, through calibration of a reference depth value of a reference plane having a fixed height difference with the TOF camera, a calibrated reference ground is set for an actually measured scene, so that the influence of a measured environment on the ground identification is avoided, and then the accuracy of obstacle detection is improved; and through calibration of parameters, the algorithm is simple and is easy to implement.

BRIEF DESCRIPTION OF THE DRAWINGS

For the sake of a clearer explanation of the technical solutions of the embodiments of this application, the accompanying drawings required by the embodiments will be described briefly below. Obviously, the accompanying drawings in the following description merely illustrate some embodiments of this application, and those ordinarily skilled in the art may also derive other accompanying drawings from these accompanying drawings without creative efforts.

DESCRIPTION OF THE EMBODIMENTS

As described in background, in the prior art, due to the complexity of ground materials and ground scenes, the difficulty to develop a corresponding ground identification algorithm is high; and factors such as multi-path reflection will lead to a large measurement error especially at positions near the ground, resulting in errors in measurement of a ground position and an obstacle height.

Figure 1A:
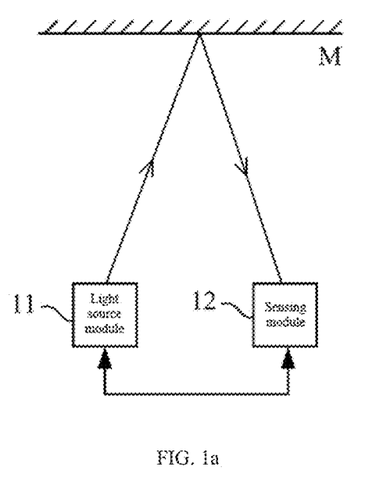
FIG. 1a and FIG. 1b are schematic diagrams of distance measurement of a TOF camera according to an embodiment of this application.
Figure 1B:
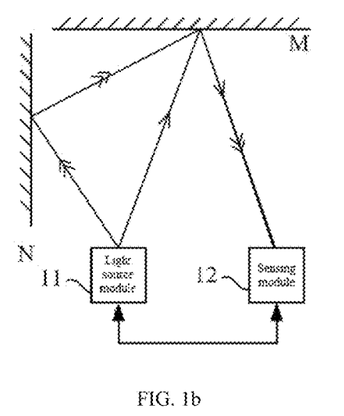

Referring to FIG. 1a and FIG. 1b, a TOF camera includes a light source module 11 and a sensing module 12, wherein the light source module 11 is configured to emit detection light to a measured object M, and the sensing module 12 is configured to receive reflected light after the detection light reaches the surface of the measured object M. A distance between the measured object and a depth camera can be calculated according to time when the detection light is emitted and time when it is received after being reflected.

FIG. 1a shows that the detection light directly reaches the measured object M and is received by the sensing module 12 after being reflected, and light propagation time corresponds to the distance between the depth camera and the measured object M. In FIG. 1b, when there is another object around the measured object M, for example, when there is an object N, part of the detection light, after reaching the surface of the object N and being reflected, reaches the surface of the measured object M, and is received by the sensing module 12 after being reflected. In this case, part of the light received by the sensing module 12 is reflected by a plurality of paths, resulting in a relatively large measurement result. This typically occurs when a reflectivity of the surface of the object N is greater than a reflectivity of the object M, and light intensity of multi-path reflection is relatively large, which greatly affects the measurement result.

The accuracy of ground identification determines the accuracy of determination of an obstacle on a ground, and it is difficult to develop a ground identification algorithm when faced with a complex ground scene. To resolve the above problem, the present disclosure provides a new obstacle recognition method of a TOF camera. A reference depth value calibrated by an external parameter is compared with an actually measured depth value, and a ground is separated from an obstacle through calibration of a characteristic value, so that the obstacle recognition is not affected by a ground scene, thereby improving the accuracy of the obstacle recognition.

The technical solutions in the embodiments of the present disclosure are described clearly and completely below in combination with the accompanying drawings. Obviously, the described embodiments are merely some embodiments of the present disclosure and are not all the embodiments. All other examples obtained by a person of ordinary skill in the art based on the embodiments of this application without creative efforts shall fall within the protection scope of this application. In the case of no conflict, the following embodiments and the technical features thereof can be combined with each other.

Figure 2:
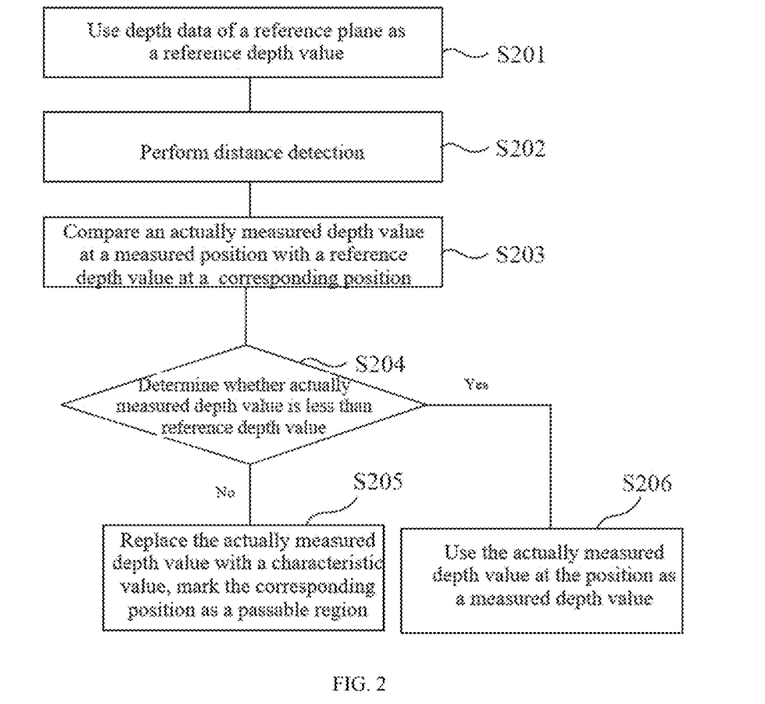
FIG. 2 is a schematic flowchart of a ground obstacle detection method of a TOF camera according to an embodiment of this application.

FIG. 2 is a schematic flowchart of a ground obstacle detection method of a TOF camera according to a specific implementation of the present disclosure.

In this embodiment, the ground obstacle detection method of a TOF camera includes the following steps.

Step S201: use depth data of a reference plane as a reference depth value.

A method for obtaining the reference depth value includes: selecting a standard plane, fixing a position of a depth camera, and detecting standard depth data at positions of the standard plane; and determining a height difference between the reference plane and the standard plane according to an actual ground feature, and obtaining, through calculation, the depth data of the reference plane as the reference depth value according to the standard depth data at positions of the standard plane.

Figure 3:
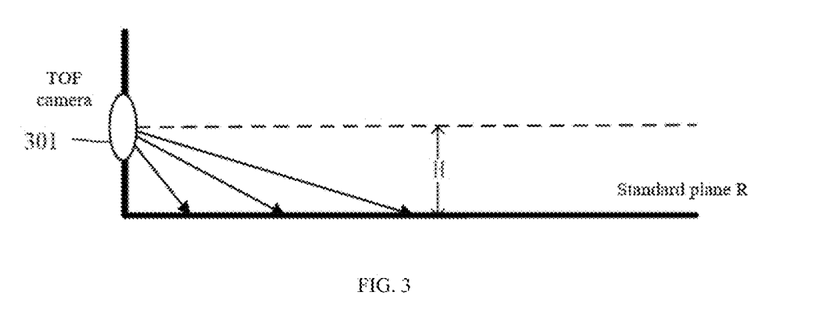
FIG. 3 is a schematic diagram of detecting standard depth data of a standard plane according to an embodiment of the present disclosure.

The standard plane is a flat plane and the standard depth data obtained through detection is not interfered by an external environment. FIG. 3 is a schematic diagram of detecting standard depth data of a standard plane according to an embodiment of the present disclosure. The standard plane R is a flat ground and has a consistent reflectivity at each position of the surface, and no other object or emission surface exists in a measured region of the standard plane R, so as to eliminate the influence of an external environment on the standard depth data obtained through measurement.

The TOF camera is fixed, and the TOF camera may be a camera module or may be assembled on an electronic device. A height difference between a TOF camera 301 and the standard plane R is H.

A sensing module of the TOF camera 301 includes pixel arrays, each pixel array corresponds to one position of the standard plane R, and in a case that positions of pixels are fixed and the height difference H between the TOF camera 301 and the standard plane is fixed, a distance between each position on the standard plane R and the corresponding pixel is a determined value. Depth data at each position of the standard plane R is obtained by the TOF camera 301 and is stored.

The height difference between the reference plane and the standard plane is determined according to the feature of the actual ground, and the depth data of the reference plane is obtained through calculation as the reference depth value according to the depth data at each position of the standard plane. Morphology features of the actual ground include a height difference between the actual ground and the TOF camera, and a concave or convex morphology of a surface.

For example, when an actual ground in an actually measured scene is flat and a height from the TOF camera to the actual ground is H, the standard plane R may be directly used as a reference plane, and the reference depth value is used as a depth value of the actual ground.

When the height from the TOF camera to the actual ground is H', a height difference between the reference plane and the standard plane R is D=H–H', and a height difference between the reference plane and the TOF camera is H', depth data at each position of the reference plane may be obtained through calculation as a reference depth value according, to the height difference D between the standard plane R and the reference plane and standard depth data of the standard plane.

In another embodiment, the height difference D between the reference plane and the standard plane may be set according to the morphology feature of the actual ground, for example, the actual ground has a recess or a protrusion, to eliminate the influence of a change of the ground morphology on the ground identification. The height difference D may be an adjustable parameter, and is dynamically adjusted according to an actual condition of the ground. For example, when the ground has a relatively large influence (poor flatness), the height difference D may be set to 10 mm, and the reference plane is raised by 10 mm. After the reference depth value is obtained, subsequent obstacle detection is performed. In a region with a high ground flatness, the height difference is appropriately reduced, for example, the height difference D is set to 5 mm. In another embodiment, the reference plane may be lowered compared with the standard plane. A person skilled in the art can raise or lower the reference plane and adjust a specific value of the height difference D according to an actual requirement.

Step S202: perform distance detection.

Distance detection is performed by using the TOF camera in an actually measured scene, to obtain an actually measured depth value of a measured object at each position in a detection field of view.

Step S203: compare the actually measured depth value at a measured position with a corresponding reference depth value.

Because the reference depth value corresponds to the reference plane, the reference plane is equivalent to an externally calibrated reference ground without interference of the environment, the actually measured depth value is compared with the reference depth value, i.e., a distance of the measured object is compared with the reference ground, and an actual obstacle in the measured object is distinguished from the reference ground.

Step S204: determine whether the actually measured depth value is less than the reference depth value.

If the actually measured depth value is not less than the reference depth value, step S205 is performed: replace the actually measured depth value with a characteristic value, and mark a corresponding position as a passable region.

When the actually measured depth value is equal to the reference depth value, it indicates that a height of the position is consistent with a height of the reference plane and the position is the ground; when the actually measured depth value is greater than the reference depth value, a corresponding condition may include that the position is the ground, but the actually measured depth value is greater than an actual depth value of the ground due to interference of factors such as multi-path reflected light. As a result, the actually measured depth value is larger, resulting in a recessed error on the detected ground. To resolve the problem, the actually measured depth value is replaced with a characteristic value, so that the entire actual ground corresponds to the same characteristic value, and the detected actual ground is marked as a passable region by the characteristic value. In a distance detection graph obtained by performing grayscale or color rending according to a measured depth value, because a measured depth value at the actual ground is replaced with the characteristic value, the grayscale or color is the same, whereas different grayscales or colors are displayed for a measured depth of another region different from the characteristic value, i.e., such region is an obstacle, so that the obstacle can be obviously distinguished from the actual ground. Only the obstacle is displayed in the entire distance detection graph, and the actual ground is used as a background. In an embodiment, the characteristic value is 0, a position where a measured depth value is greater than 0 is an obstacle, and the accuracy of obstacle recognition can be improved. In another embodiment, the characteristic value may be set to another value, which is not limited herein.

If the actually measured depth value is less than the reference depth value, step S206 is performed: taking the actually measured depth value at the position as a measured depth value. When the actually measured depth value is less than the reference depth value, it indicates that an obstacle exists at the position, and flight of the detection light is blocked, resulting in a relatively small actually measured depth value. Therefore, if the actually measured depth value is less than the reference depth value, the actually measured depth value may be taken as the measured depth value.

According to the above solution, a calibrated reference ground is set for an actually measured scene through calibration of a reference depth value of a reference plane, avoiding the influence of a measured environment on the ground identification, so that the accuracy of obstacle detection is improved: and through calibration of parameters, the algorithm is simple, and is easy to implement.

Figure 4:
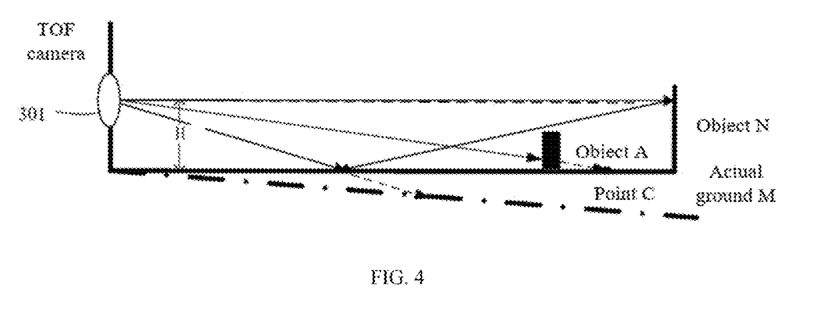
FIG. 4 is a schematic diagram of performing ground obstacle detection by using a TOF camera according to an embodiment of the present disclosure.

FIG. 4 is a schematic diagram of ground obstacle detection according to an embodiment of the present disclosure.

In this embodiment, an actual ground M is a flat plane, and a value of a distance between the actual ground M and the TOF camera 301 is so that the standard plane R is used as a reference plane, and a reference depth value calibrated based on the standard plane R is used as a measured depth value of the actual ground M.

Because there are a plurality of objects such as an object A and an object N on the actual ground M, multi-path reflection caused by each object will lead to a larger measured depth value of the actual around. As a result, a measured ground P is lower than the actual ground M.

In this embodiment, when the actually measured depth value is greater than or equal to a corresponding reference depth value, the actually measured depth value is replaced with a characteristic value to eliminate the interference of an external environment to a detection structure. The reference depth value of the reference plane may be used as the measured depth value of the actual ground M to eliminate the external interference to the ground detection.

When an obstacle such as an object A is detected, an originally corresponding ground position is point C, and when the object A exists, an actually measured depth value obtained by the corresponding pixel is less than a reference depth value corresponding to the point C because the object A blocks the detection light. Therefore, when the actually measured depth value is less than the reference depth value, the actually measured depth value is remained as the measured depth value.

By the above method, an obstacle can be separated from a ground without being affected by complex ground materials and surrounding environment, thereby achieving accurate obstacle recognition.

When a ground of a measured region has protrusions or recesses with a certain height, in an actual ground navigation application, the recesses or the protrusions of the ground need to be ignored. For example, in a application scenario of a sweeping robot, a ground usually has protrusions with a relatively small height such as a carpet, a floor tile gap, and a door frame, and these regions require the sweeping robot to pass normally and cannot be recognized as obstacles. The height of the reference plane can be adjusted to avoid that the protrusion or the recess is recognized as an obstacle.

Figure 5:
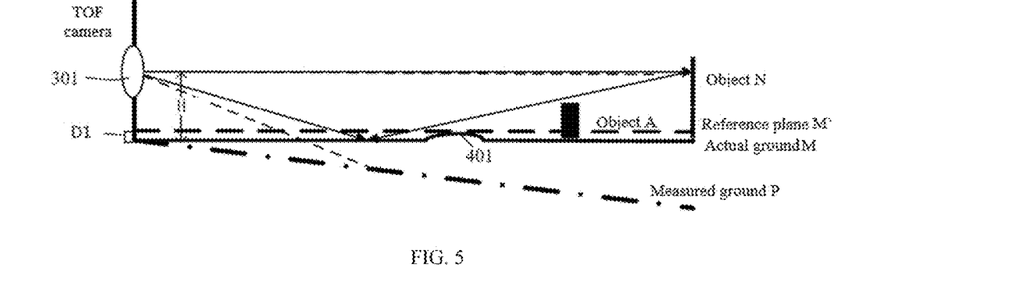
FIG. 5 is a schematic diagram of performing ground obstacle detection by using a TOF camera according to an embodiment of the present disclosure.

Please refer to FIG. 5 which is a schematic diagram of ground obstacle detection according to another embodiment of the present disclosure.

In this embodiment, the actual ground M has a protrusion 401 with a protrusion height of D1. A reference plane M' is set, and a height of the actual ground M is consistent with the height of the standard plane R. Therefore, there is a height difference D1 between the reference plane M' and the standard plane R, and the reference plane M' is used as a reference ground, which is equivalent to raising the ground by D1.

During actual measurement, only an object with a height higher than the reference plane M' is considered as an obstacle. Because the reference plane M' is higher than the actual ground M, a measured height of the object A is an actual height minus the height difference D1. Because the obstacle usually has a relatively large height, the measured height is relatively small but does not affect the determination of the obstacle.

In another embodiment, when there are a plurality of protrusions on the ground, the height difference D1 may be set to be consistent with the height of the highest protrusion, or slightly greater than the height of the highest protrusion.

Figure 6:
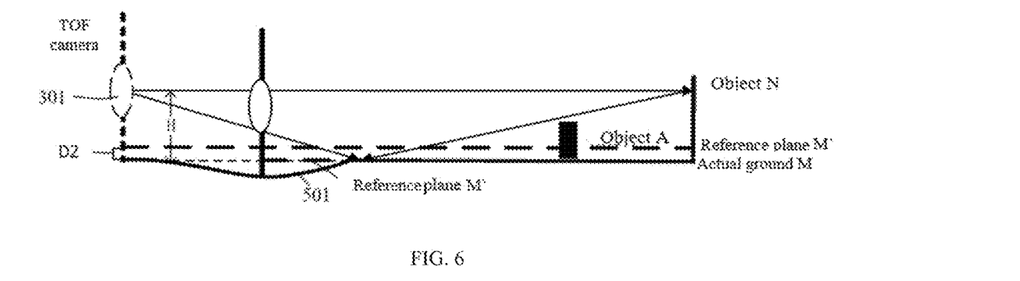
FIG. 6 is a schematic diagram of performing ground obstacle detection by using a TOF camera according to an embodiment of the present disclosure.

Please refer to FIG. 6 which is a schematic diagram of ground obstacle detection according to another embodiment of the present disclosure.

In this embodiment, the actual ground M has a recess 501 with a recess depth of D2. A reference plane of the TOF is raised by D2 relative to the standard plane R to form a reference plane M'.

When the TOF camera 301 is at a flat position of the actual ground M, the reference plane M' of the TOF camera 301 is higher than the actual ground, and the entire actual ground including the recess 501 can be shielded.

When the TOF camera 301 moves to the recess 501, for example, to the lowest position of the recess 501, the reference plane M' is lowered to the actual ground M along with the TOF camera, and the actual ground M can be shielded to prevent the actual ground M outside the recess 501 from being detected as an obstacle.

In another specific implementation, to enable that when the TOF camera 301 enters the recess 501, the actual ground can be completely shielded, the reference plane M' of the TOF camera 301 can be raised by a distance of D2 or more relative to the standard plane R'.

In another embodiment, the height difference D between the reference plane M' and the standard plane R may be set according to a height difference threshold F of a protrusion or a recess through which a navigation device provided with the TOF camera can pass, where the height difference D≤F.

In another embodiment of the present disclosure, the height difference D between the reference plane M' and the standard plane R can be dynamically adjusted according to a morphology condition of the actual ground in a moving process of the TOF camera 301.

Figure 7A:
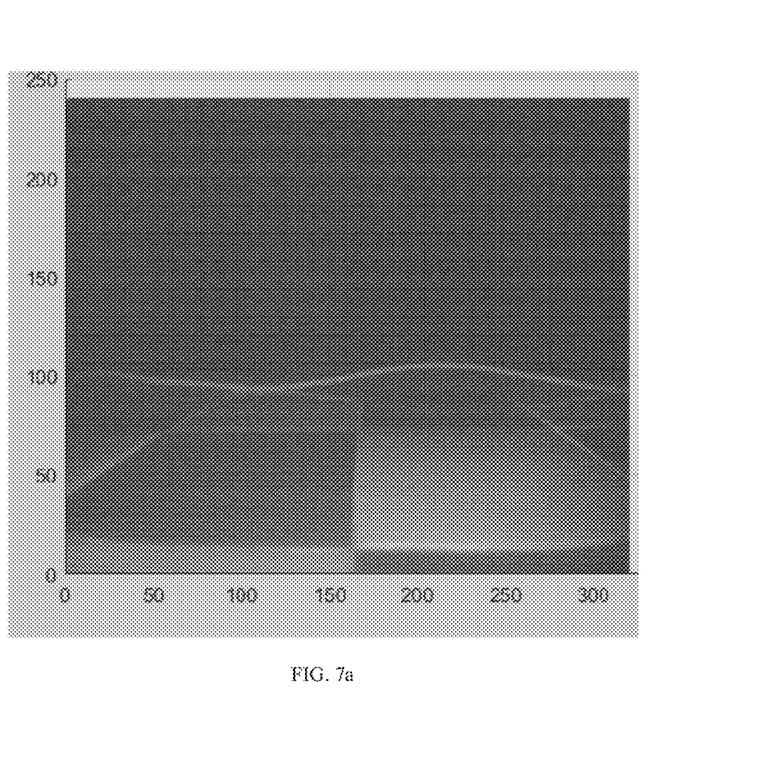
FIG. 7a and FIG. 7b are schematic diagrams of an actual ranging effect according to an embodiment of the present disclosure.
Figure 7B:
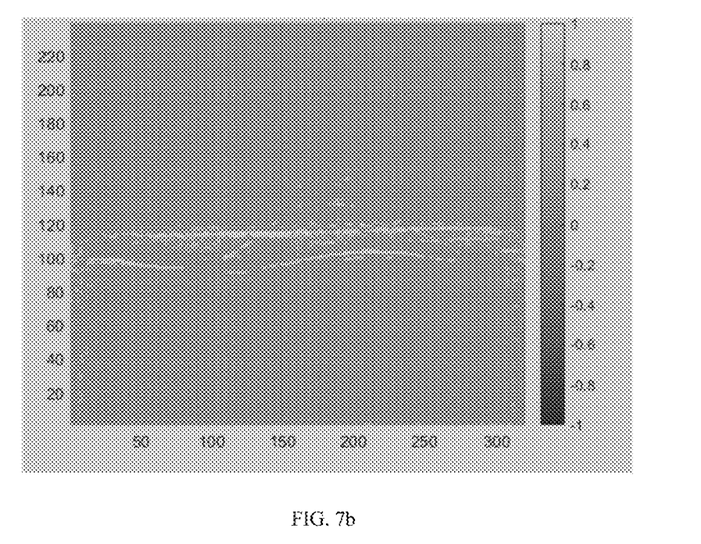

Please refer to FIG. 7a and FIG. 7b which are schematic diagrams of an actual distance measurement effect according to an embodiment of the present disclosure.

In this embodiment, for an environment of a checkerboard ground adopting ceramic tile ground with different colors, a depth graph obtained after grayscale rendering is performed on measured depth values obtained by using a conventional distance measurement method is shown in FIG. 7a, due to a difference among reflectivities of ceramic tiles with different colors on a ground as well as factors such as multi-path reflection at a position of a ceramic tile gap, a measured distance at each position of the ground changes periodically along with the color of the ceramic tile, and due to reflection projection of the ceramic tile on an electric wire on the ground, the projection of the electric wire appears on the ground.

Referring to FIG. 7b, by using the method of the present disclosure, a reference depth value of a reference plane of a TOF camera is calibrated, to shield the influence of factors such as materials and reflectivities of the ground during measurement, the reflection of the electric wire is eliminated, and the electric wire can be separated from the actual ground, thereby accurately recognizing the electric wire on the ground.

An embodiment of the present disclosure further provides a TOF camera.

Figure 8:
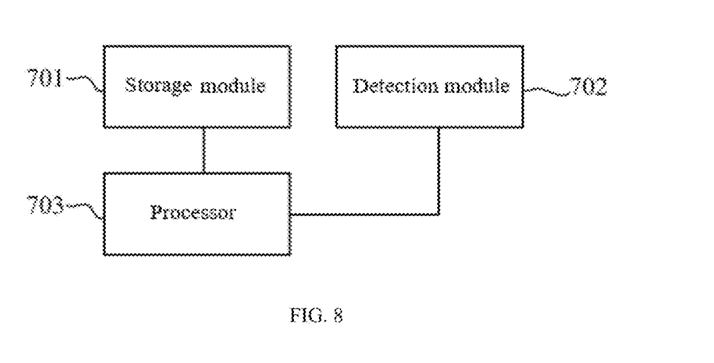
FIG. 8 is a schematic structural diagram of a TOF camera according to an embodiment of the present disclosure.

Please refer to FIG. 8 which is a schematic structural diagram of a TOF camera according to an embodiment of the present disclosure.

The TOF camera includes a storage module 701, a detection module 702 and a processor 703.

The storage module 701 is used to store a reference depth value and a characteristic value, wherein the reference depth value is depth data of a reference plane, and the characteristic value is used for marking a passable region.

The reference plane is formed based on standard depth data of a standard plane. There is a fixed height difference between the standard plane and the TOF camera, and the standard plane is a flat plane and the standard depth data obtained through measurement is not interfered by an external environment. The reference plane may be set according to a feature of an actual ground, and the reference depth value corresponding to the reference plane is obtained through calculation according to the standard depth data and by using a height difference between the reference plane and the standard plane.

When the actual ground is flat, and a height difference between the actual around and the TOF camera is consistent with the height difference between the standard plane and the TOF camera, the standard plane is used as the reference plane; when the actual ground is flat and the height difference between the actual ground and the TOF camera is H', the height difference between the reference plane and the standard plane is set to H−H'; and when the actual ground has a recess or a protrusion, the reference plane is set to be higher than the standard plane, and there is a height difference D between the reference plane and the standard plane, and the height difference D is greater than or equal to a height of the recess or the protrusion of the actual ground.

The detection module 702 is used to obtain an actually measured depth value at a measured position.

The detection module 702 includes a light emitting unit and a sensing unit, wherein the light emitting unit is configured to emit detection light, and the sensing unit is configured to receive reflected light of the detection light. The actually measured depth value at the measured position is obtained by a time of flight of the detection light.

The processor 703 is configured to: compare the actually measured depth value at the measured position with a corresponding reference depth value; replace the actually measured depth value with the reference depth value if the actually measured depth value is greater than or equal to the reference depth value, and use the reference depth value as a measured depth value; and use the actually measured depth value at the position as the measured depth value if the actually measured depth value is less than the reference depth value.

When the actually measured depth value is equal to the reference depth value, it indicates that a height of the position is consistent with a height of the reference plane and the position is the ground. When the actually measured depth value is greater than the reference depth value, a corresponding condition may include that the position is the ground, but the actually measured depth value is greater than an actual depth value of the ground due to interference of factors such as multi-path reflected light. As a result, the actually measured depth value is larger, resulting in a recessed error on the detected around. To resolve this problem, the actually measured depth value is replaced with a reference depth value to eliminate the error.

If the actually measured depth value is less than the reference depth value, the actually measured depth value at the position is used as a measured depth value. When the actually measured depth value is less than the reference depth value, it indicates that an obstacle exists at the position, and flight of the detection light is blocked, resulting in a relatively small actually measured depth value. Therefore, if the actually measured depth value is less than or equal to the reference depth value, the actually measured depth value may be used as the measured depth value.

The above described TOF camera can accurately separate an obstacle from the ground, to improve the accuracy of obstacle recognition.

An embodiment of the present disclosure further provides a ground navigation device, including the TOF camera according to the embodiments described above. The ground navigation device can accurately recognize an obstacle during ground navigation, and is applied to a complex ground scene.

The above descriptions are merely the embodiments of this application, and are not intended to limit the patent scope of this application. Any equivalent structure or equivalent process change made by using content in this specification and the accompanying drawings of this application, for example, mutual combination of technical features between the embodiments, or directly or indirectly application thereof in other relevant technical fields, similarly falls within the scope of the patent protection of this application.

What is claimed is:

1. A ground obstacle detection method of a time of flight (TOF) camera, comprising:
   using depth data of a reference plane as a reference depth value;
   performing distance detection, and comparing an actually measured depth value at a measured position with a corresponding reference depth value;
   replacing the actually measured depth value with a characteristic value if the actually measured depth value is greater than or equal to the reference depth value, and marking a corresponding position as a passable region; and
   remaining the actually measured depth value at the position if the actually measured depth value is less than the reference depth value,
   wherein a method for obtaining the reference depth value comprises: selecting a standard plane, fixing a position of the TOF camera, and detecting standard depth data at each position of the standard plane; and determining a height difference between the reference plane and the standard plane according to a feature of an actual ground, and obtaining, through calculation, the depth data of the reference plane as the reference depth value according to the standard depth data of the standard plane.

2. The ground obstacle detection method according to claim 1, wherein a height difference between the standard plane and the TOF camera is H and the standard plane has a flat surface, and the standard depth data is not interfered by an external environment.

3. The ground obstacle detection method according to claim 2, wherein when the actual ground is flat and a height difference between the actual ground and the TOF camera is consistent with the height difference between the standard plane and the TOF camera, the standard plane is used as the reference plane.

4. The ground obstacle detection method according to claim 2, wherein when the actual ground is flat and a height difference between the actual ground and the TOF camera is H', the height difference between the reference plane and the standard plane is set to H–H'.

5. The ground obstacle detection method according to claim 2, wherein when the actual ground has a recess or a protrusion, the reference plane is set to be higher than the standard plane and the height difference between the reference plane and the standard plane is D.

6. The ground obstacle detection method according to claim 5, wherein the height difference D is greater than or equal to a height of the recess or the protrusion of the actual ground.

7. A TOF camera, comprising:
   a storage module, configured to store a reference depth value and a characteristic value, wherein the reference depth value is depth data of a reference plane, and the characteristic value is used for marking a passable region;
   a detection module, configured to obtain an actually measured depth value at a measured position; and
   a processor, configured to compare the actually measured depth value at the measured position with a corresponding reference depth value; replace the actually measured depth value with the characteristic value if the actually measured depth value is greater than or equal to the reference depth value, and mark a corresponding position as a passable region; and remain the actually measured depth value at the position if the actually measured depth value is less than the reference depth value, wherein a method for obtaining the reference depth value comprises: selecting a standard plane, fixing a position of the TOF camera, and detecting standard depth data at each position of the standard plane; and determining a height difference between the reference plane and the standard plane according to a feature of an actual ground, and obtaining, through calculation, the depth data of the reference plane as the reference depth value according to the standard depth data of the standard plane.

8. The TOF camera according to claim 7, wherein a height difference between the standard plane and the TOF camera is H and the standard plane has a flat surface, and the standard depth data is not interfered by an external environment.

9. The TOF camera according to claim 8, wherein when a height difference between the actual ground and the TOF camera is consistent with the height difference between the standard plane and the TOF camera, the standard plane is used as the reference plane.

10. The TOF camera according to claim 8, wherein when the actual ground is flat and a height difference between the actual ground and the TOF camera is H', the height difference between the reference plane and the standard plane is set to H–H'.

11. The TOF camera according to claim 8, wherein when the actual ground has a recess or a protrusion, the height difference between the reference plane and the standard plane is set to D, and the height difference D is greater than or equal to a height of the recess or the protrusion of the actual ground.

12. A ground navigation device, comprising a TOF camera, the TOF camera comprises:

a storage module, configured to store a reference depth value and a characteristic value, wherein the reference depth value is depth data of a reference plane, and the characteristic value is used for marking a passable region;

a detection module, configured to obtain an actually measured depth value at a measured position; and a processor, configured to: compare the actually measured depth value at the measured position with a corresponding reference depth value; replace the actually measured depth value with the characteristic value if the actually measured depth value is greater than or equal to the reference depth value, and mark a corresponding position as a passable region; and remain the actually measured depth value at the position if the actually measured depth value is less than the reference depth value, wherein a method for obtaining the reference depth value comprises: selecting a standard plane, fixing a position of the TOF camera, and detecting standard depth data at each position of the standard plane; and determining a height difference between the reference plane and the standard plane according to a feature of an actual ground, and obtaining, through calculation, the depth data of the reference plane as the reference depth value according to the standard depth data of the standard plane.

13. The ground navigation device according to claim 12, wherein a height difference between the standard plane and the TOF camera is H and the standard plane has a flat surface, and the standard depth data is not interfered by an external environment.

14. The ground navigation device according to claim 13, wherein when a height difference between the actual ground and the TOF camera is consistent with the height difference between the standard plane and the TOF camera, the standard plane is used as the reference plane.

15. The ground navigation device according to claim 13, when the actual ground is flat and a height difference between the actual ground and the TOF camera is H', the height difference between the reference plane and the standard plane is set to H–H'.

16. The ground navigation device according to claim 13, wherein when the actual ground has a recess or a protrusion, the height difference between the reference plane and the standard plane is set to D, and the height difference D is greater than or equal to a height of the recess or the protrusion of the actual ground.

* * * * *